R. H. WELLES.
ADJUSTABLE CLAMP SUPPORT.
APPLICATION FILED FEB. 24, 1914.
1,182,123.
Patented May 9, 1916.
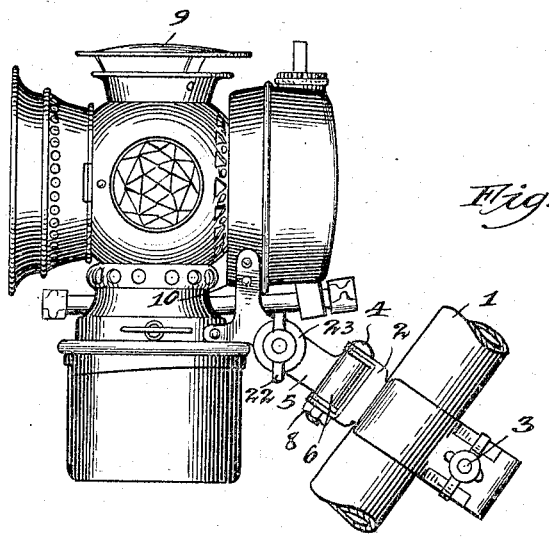

UNITED STATES PATENT OFFICE.

RICHARD H. WELLES, OF KENOSHA, WISCONSIN, ASSIGNOR TO THE BADGER BRASS MFG. CO., OF KENOSHA, WISCONSIN, A CORPORATION OF WISCONSIN.

ADJUSTABLE CLAMP-SUPPORT.

1,182,123.   Specification of Letters Patent.   Patented May 9, 1916.

Application filed February 24, 1914. Serial No. 820,459.

*To all whom it may concern:*

Be it known that I, RICHARD H. WELLES, a citizen of the United States, residing in the city of Kenosha, county of Kenosha, and State of Wisconsin, have invented certain new and useful Improvements in Adjustable Clamp-Supports, of which the following is a specification.

This invention relates to improvements in adjustable-clamp supports, and refers more particularly to an adjustable-clamp support suitable for use with apparatus subjected to severe vibration.

Among the salient objects of the invention are to provide an adjustable, interlocking clamp-connection between a pair of members, the relative angular position of which must be capable of comparatively accurate adjustment; to provide a construction in which the relative angular adjustment may be changed at will; to provide a construction in which the two relatively-adjustable members will be securely interlocked together against angular movement in whatever angular positions they may be adjusted, and do not depend upon friction alone for preventing said angular movement; to provide a construction in which a change in angular adjustment may be made by loosening a single clamping member, and the parts again locked together by tightening up the said clamping member; to provide an adjustable clamp which shall be simple and economical of construction; and in general to provide an improved clamp of the character referred to.

The invention consists in the matters hereinafter described, and more particularly pointed out in the accompanying drawings, in which,—

Figure 1 is a side view of my improved clamp-support, showing it applied to a bicycle-lamp and the steering post of a bicycle; Fig. 2 is a perspective view of a portion of the clamp, one of the elements being removed; Fig. 3 is a perspective view of the element removed from the clamp shown in Fig. 2; Fig. 4 is a perspective view of the portion of the clamp shown in Fig. 2, the bolt being removed; and Fig. 5 is a perspective view of the clamping bolt.

Referring to the drawings, in Fig. 1, I illustrate a preferred embodiment of my improved clamp, which is used for securing a bicycle-lamp in adjustable position to the steering post of a bicycle. In this view, 1 represents a portion of the steering post, 2 the steering-post clamp, which may be adjusted in position upon the steering post by the bolt 3. The stationary inclined bolt 4 forms an adjustable support for the arm 5 of the adjustable clamp proper, the latter having an inclined boss 6, through which is drilled a longitudinal hole 7 for the reception of the bolt 4. The arm 5 is capable of swinging upon the bolt 4, but is intended to be locked in its permanent position by tightening the nut 8, threaded upon the lower end of the bolt.

The interlocking adjustable feature of the clamp proper will now be described. Securely riveted to the lamp 9 are two die-formed sheet-metal members 10 and 11, which are so shaped and located upon the lamp as to provide a pair of parallel, circular, flat lug portions 12 and 13, which are spaced apart a sufficient distance to fit loosely upon either side of the relatively stationary arm 5, which they embrace. The right-hand lug 13 has punched in it a circular, serrated aperture 14. The other lug 12 is provided with a smaller circular aperture 15, axially in line with the aperture 14 in the other lug, and large enough to admit loosely the threaded end of the clamping bolt 16. The latter has a round head 17, and a square neck portion 18 between the head and the screw-threaded end. In order to prevent the relatively small head 17 from being pulled through the aperture 14, I interpose between the lug 13 and the bolt-head a washer 19, which is somewhat larger in diameter than the serrated aperture 14. The adjustable interlocking feature is taken care of by a circular, serrated, punched washer 20, the teeth in the edge of which engage the serrations in the aperture 14. The washer 20 is prevented from rotating about the bolt 16 by having punched in it a square hole of the proper size to admit the neck portion 18 of the bolt. Relative angular movement of the clamping bolt with reference to the stationary arm 5 is prevented by forming in the latter a rectangular slot 21 of the proper width to admit freely the squared neck portion 18. The slot 21 is made with an open mouth in order to permit the insertion of the arm 5 without it being necessary to remove the butterfly nut 22. Between the butterfly nut 22 and the member 12, I interpose a circular punched washer 23.

As previously described, the two members 12 and 13 are spaced apart a sufficient distance freely to admit the end of the arm 5; but when the clamping bolt 22 is screwed up tight, the members 12 and 13, being of resilient sheet-metal and relatively thin, are squeezed tightly into engagement with the sides of the end of the arm 5. This frictional clamping effect, however, is not alone relied upon to maintain the arm and the adjustable lugs in permanent angular position with relation to each other; this feature being taken care of by the clamping bolt 16, the neck portion of whch is locked against rotation in the member 5, the lug 13 being locked against rotation upon the bolt by means of the interlocking member 20. To adjust the lamp in a different angular position with reference to the arm 5, the butterfly nut 22 is unscrewed a sufficient distance to permit the member 20 to move axially outward far enough to disengage the serrations in the aperture 14. The lamp may then be rotated one or more teeth, as the case may be. The butterfly nut 22 is then screwed up, pulling the serrated disk 20 back into engagement with the notches in the aperture 14, and also clamping the two lugs tightly against the arm 5.

It is unnecessary to go further into detail in describing the operation of the clamp. It will be seen that the lamp is capable of occupying as many angular positions with reference to the member 5 as there are teeth in the aperture 14. The greater the number of teeth in the aperture the more delicate an adjustment may be made.

I do not limit myself to the details of construction shown except as specified in the appended claims.

I claim:

1. In a bicycle lamp clamp, the combination of a relatively stationary member, a member capable of angular adjustment with reference to said stationary member, and a clamping member positively interlocked with said first two members against angular movement relative to said first two members, one of said first two members having means interlocking with said clamping member in a plurality of different angular positions, and slidable with reference to both of said first two members whereby it may be temporarily disengaged from said member with which it may be locked in a plurality of different positions and reëngaged in any one of said different angular positions.

2. In a clamp, the combination of a relatively stationary supporting-arm, an adjustable member having a lug on one side of said arm, and a bolt keyed to said arm for clamping the latter to the lug, said lug having means for engaging said bolt in a plurality of different angular positions and locking it against relative rotation, both the arm and the lug being independently locked against rotation on said bolt when the latter is tightened.

3. The combination of a relatively-stationary supporting-arm, an adjustable member having a pair of flat lugs on either side of said arm, and a clamping bolt keyed to said arm for clamping the latter between said lugs, one of said lugs having means for engaging said bolt in a plurality of different angular positions with reference to said bolt and locking it against relative rotation.

4. In a clamp, the combination of a relatively stationary supporting-arm, a lug on one side of said arm and provided with a serrated aperture, and a clamping bolt keyed to said arm, passing through said aperture, and provided with a projection for engaging said serrations.

5. In a clamp, the combination of a relatively stationary supporting-arm, a relatively adjustable member having a lug on one side of said arm, said lug being provided with a circular toothed aperture, and a clamping bolt axially slidable, but keyed to said arm, passing through said aperture, and provided with a projection for engaging said serrations.

6. In a clamp, the combination of a relatively stationary arm, an adjustable member having a pair of flat lug portions on either side of said arm, one of said lug portions being provided with a circular serrated aperture, and a clamping bolt axially slidable, but locked against relative rotation on said arm, passing through said aperture in the lug, and provided with a projection for engaging said serrations.

7. In a clamp, the combination of a relatively stationary arm, and adjustable lug member on one side of said arm provided with a circular toothed aperture, a clamping bolt slidable on said arm, but locked against rotary movement in said arm, and having a toothed projection for engaging the teeth in said aperture.

8. In a clamp, the combination of a relatively stationary arm, an adjustable lug on each side of said arm, one of said lugs having a circular aperture with inwardly projecting teeth formed therein, and the other lug having an aperture for the admission of a clamping bolt, and a clamping bolt passing through both of said apertures and axially slidable with reference to said arm, but having means for preventing its rotation with reference to said arm, and engaging said teeth.

9. In a clamp, the combination of a relatively stationary arm, an adjustable resilient lug on each side of said arm, said lugs being connected together a suitable distance apart normally to freely admit said arm, one of said lugs having a circular aperture with inwardly projecting teeth formed therein, and the other lug having an aperture for the admission of a clamping bolt, a clamping bolt passing through both of said apertures and axially slidable with reference to said arms, but having means for preventing its rotation with reference to said bolt, and a flat toothed member keyed to said arm, located within said circular aperture and engaging said serrations.

RICHARD H. WELLES.

Witnesses:
ALBERT H. GRAVES,
EMILIE ROSE.

Copies of this patent may be obtained for five cents each, by addressing the "Commissioner of Patents. Washington, D. C."